(12) United States Patent
Kim et al.

(10) Patent No.: US 12,530,272 B2
(45) Date of Patent: Jan. 20, 2026

(54) METHOD OF PERFORMANCE HARVESTING IN CORE MATRIX STRUCTURE AND DEVICE OF PERFORMING THE SAME

(71) Applicant: Soteria Inc., Seoul (KR)

(72) Inventors: James Jongman Kim, Seoul (KR); Chang Il Son, Gwacheon-si (KR)

(73) Assignee: Soteria Inc., Seoul (KR)

( * ) Notice: Subject to any disclaimer, the term of this patent is extended or adjusted under 35 U.S.C. 154(b) by 0 days.

(21) Appl. No.: 18/676,893

(22) Filed: May 29, 2024

(65) Prior Publication Data

US 2024/0338289 A1 Oct. 10, 2024

(30) Foreign Application Priority Data

Apr. 7, 2023 (KR) .................. 10-2023-0045902

(51) Int. Cl.
*G06F 11/00* (2006.01)
*G06F 11/22* (2006.01)
*G06F 11/263* (2006.01)

(52) U.S. Cl.
CPC ........ *G06F 11/263* (2013.01); *G06F 11/2236* (2013.01); *G06F 11/2268* (2013.01)

(58) Field of Classification Search
CPC .............. G06F 11/263; G06F 11/2236; G06F 11/2268; G06F 11/202; G06F 11/2038; G06F 11/2041; G06F 11/0724
See application file for complete search history.

(56) References Cited

U.S. PATENT DOCUMENTS

| | | | |
|---|---|---|---|
| 2006/0212677 A1* | 9/2006 | Fossum | G06F 9/5027 712/1 |
| 2010/0192012 A1* | 7/2010 | Parulkar | G06F 11/2242 714/24 |
| 2014/0025991 A1* | 1/2014 | Anandavally | G06F 11/079 714/E11.061 |
| 2014/0331077 A1* | 11/2014 | Tounou | G06F 11/0724 714/4.1 |
| 2015/0293173 A1* | 10/2015 | Tsuboi | G06F 11/08 714/727 |
| 2016/0239393 A1 | 8/2016 | Alvarez-Icaza Rivera et al. | |
| 2020/0285540 A1* | 9/2020 | Garza | G06F 11/0724 |
| 2022/0342739 A1* | 10/2022 | Zhang | G06F 11/0724 |
| 2024/0160825 A1* | 5/2024 | Annamalai | G06F 30/392 |

FOREIGN PATENT DOCUMENTS

| | | | |
|---|---|---|---|
| JP | 4746641 B2 | 8/2011 | |
| KR | 10-2015-0118035 A | 10/2015 | |
| KR | 10-2022-0001222 A | 1/2022 | |

* cited by examiner

*Primary Examiner* — Joseph D Manoskey
(74) *Attorney, Agent, or Firm* — Sughrue Mion, PLLC

(57) ABSTRACT

The present disclosure relates to a method and device for performing performance harvesting, where multiple cores are embedded in a matrix structure and configured to perform their operations independently, for allowing the remaining cores, which operate normally despite some cores not functioning, to independently produce results of operations by harvesting their respective performances, by being configured to test the operations of each of the multiple cores, bypass cores with defects (or faults, fails, etc.), and exclude the defected cores from the operations.

13 Claims, 10 Drawing Sheets a device (or chip) of performing performance harvesting in a core matrix structure

METHOD OF PERFORMANCE HARVESTING IN CORE MATRIX STRUCTURE AND DEVICE OF PERFORMING THE SAME

TECHNICAL FIELD

The present disclosure relates to a method and device for performing performance harvesting, where multiple cores are embedded in a matrix structure and configured to perform their operations independently, for allowing the remaining cores, which operate normally despite some cores not functioning, to independently produce results of operations by harvesting their respective performances, by being configured to test the operations of each of the multiple cores, bypass cores with defects (or faults, fails, etc.), and exclude the defected cores from the operations.

BACKGROUND

The demands for hashing, encryption, or machine learning by performing large-scale computations in fields such as cryptocurrency, digital signatures, internet banking, artificial intelligence, and so on, is ever-expanding. For a learning engine of artificial intelligence, as well as for hash functions or encryption, an immense volume of high-speed computations is essential.

A system designed to process vast amounts of computations or tasks at high speeds is configured to process large-scale operations by arranging cores that perform core operations (or tasks) in a matrix form. The system is sometimes implemented on a single chip, into a board arranging multiple chips into a matrix form on the board if a single chip is insufficient, into a self by installing multiple boards in the self, or a rack by installing multiple shelves in the rack.

Of course, depending on the scale of operations, it is possible to implement the system in various forms on a single chip such as SoC (System on a Chip), on a single package such as SoP (System on a Package), or on a single wafer such as SoW (System on a Wafer), respectively. Therefore, it is also acceptable to interchangeably use the terms such as a device or a chip to refer to a system.

The system according to the present invention can be implemented, including but not limited to, a chip configured with multiple cores operating independently to perform designated computations, a board configured with multiple chips operating independently on the board to perform designated computations, or a shelf or a rack configured with multiple boards operating independently on the shelf or rack to perform designated computations. Indeed, it is possible for the system according to the present invention to allow for expanding the scale to include multiple cores, multiple chips, multiple boards, and multiple shelves or racks.

In the case of a device composed of a chip embedded with multiple cores, defects can occur either during the manufacturing process of the chip (i.e., manufacturing defect) or during the usage of the chip (i.e., usage defect). Until now, if a defect was identified in a specific core through chip testing in the manufacturing process of the chip, the chip was clearly discarded. Completely discarding a chip due to an error in a specific core in the chip with matrix structured multiple cores, each performing an independent operation, can indeed decrease the chip yield and result in significant waste of resources.

Even in the cases where multiple chips are arranged in a matrix form on a board or multiple boards are mounted on a shelf or rack to form a system, replacing the corresponding chip, or repairing/replacing the board due to a defect in a specific core during its usage can lead to significant waste of time and resources.

That is, in traditional systems, if a defect is occurred in a specific core during manufacturing process or usage, it was necessary to either discard the chip or replace the board containing the defected chip.

Especially as the circuitry line width in a semiconductor chip continues to shrink, there are issues that chips manufactured with finer circuitry line widths tend to have relatively lower yields compared to those with less fine circuitry line widths, and shorter lifetime in chip usage.

In the present invention, the state of each core within a chip is monitored and a specific core in which a defect occurs is bypassed for resolving the above issues, and thus even if the defect occurs in one of the multiple cores constituting the chip, either during manufacturing or usage, the chip is designed as a whole to still perform specific operations or functions without any error.

According to a chip design method of the present invention, there are advantages in improving chip yields and, furthermore, extending the lifetimes of both chip and board. Furthermore, in the case of the board, even if a defect occurs in a specific chip or core, the chip is designed that the board still performs computational functions without any error.

The method and device according to the present invention can be beneficially utilized in various applications such as hashing (including SHA-256, SHA-512, Proof-of-work, etc.), encryption or machine learning algorithms used in internet banking, proof-of-work for cryptocurrencies (e.g., bitcoin, etc.), digital signatures, artificial intelligence, and so on, where numerous cores are configured to perform independent computational operations, respectively. And their utilizations are not limited to any specific scope of applications.

Next, an overview of prior arts existing in the technical field of the present invention is provided. And subsequently the technical aspects that aims to distinctively achieve compared to the prior arts are described.

First, Korean Patent Publication No. 2022-0001222 A (Jan. 5, 2022) relates to a memory system for handling bad blocks and its operational method, it provides a memory system comprising a controller deciding whether a first memory block identified as a bad block among a memory device comprising multiple memory blocks and the multiple memory blocks is reused, and determining the block information of the first memory block based on the block information of a second memory block storing a second program sequence number adjacent to a first program sequence number (PSN) stored in the reused first memory block.

That is, the Korean Patent Publication No. 2022-0001222 A pertains to a method for handling bad blocks in a memory system, which provides a device and method for updating information on available blocks after a runtime bad block management operation determining a specific block as a bad block within the memory device while the memory system performs data input and output operations in response to requests from the host, and thus aims to enhance the operational stability and reliability of the memory system by more clearly defining the status of the reused memory block through estimation or calculation of wear due to previous usage, even if the memory block is deemed healthy for reuse, in the case of deleting information regarding memory blocks determined as bad blocks through the runtime bad block management operation. In particular, the controller is configured to perform data input and output operations for at least one memory block among multiple memory blocks and determine at least one memory block as a bad block based on predefined conditions, such as the time taken for a program (removing) operation, during the execution of the data input and output operations.

However, there is a distinction between the present invention and the Korean Patent Publication No. 2022-0001222 A in that the present invention does not specifically pertain to a memory, and furthermore, the device according to the present invention comprises multiple cores embedded in a matrix form, where the multiple cores are configured to perform operations independently of each other, the system is configured to test the operation of each core and bypass cores with failures, excluding them from operations. The present invention pertains to a performance harvesting method and system where, even if some cores are not operational, the remaining functional cores independently contribute their performance to output the result of the entire operation.

On the other hand, Japanese Patent No. 4746641 B2 (May 20, 2011) is to carry out data management in DRAM and NAND, based on the management information maintained by the bad cluster table, which manages the memory location of data where ECC error occurs, when data reading processing of the NAND memory accompanying processing of writing data stored in the NAND memory to the NAND memory is executed in response to a request from the data management unit, in a memory system equipped with DRAM for performing read/write operations at a cluster level or below, and NAND memory for performing read/write operations at a page level.

In other words, Japanese Patent No. 4746641 B2 is to record and manage cluster addresses that have become unreadable from NAND memory in bad cluster table, and thus it is differ from the present invention in the objective, configuration, and effectiveness, in that those of the present invention are to harvest the corresponding operational results by harnessing the performance of the remaining cores to ensure normal operation of the chip, board, or system despite the presence of some of faulty cores, by configuring to exclude faulty cores from operations by bypassing the faulty cores among multiple cores.

The aforementioned prior arts focus on managing bad blocks or bad clusters at the block or cluster level in memory systems structured with addressing divided into blocks or clusters, on contrary, the present invention pertains to a method and system for harvesting a required operational results by harnessing the performance of normally operating remaining cores even if some cores are not operational, by designing to bypass specific cores in a core matrix structure if defects occur in the specific cores during the manufacturing process or during usage, thereby the prior arts lack any explicit description or implication of technical configurations related to the features of the present invention.

BRIEF SUMMARY OF THE EMBODIMENTS

The present invention is devised to resolve the issues described in the above, it is an objective of the present invention to provide a method of performance harvesting and a device performing the method, in which the device embedding multiple cores in a matrix form enables the device (chip) harvesting performance with the operations of the remaining cores even when a specific core is faulty, thereby exhibiting a certain level of performance where each of the multiple cores individually performs independent operations (or tasks).

Furthermore, it is another objective for the present invention to provide a method and a device that ensure outputting corresponding operation result through the performance exhibited by the normally operated remaining cores of the device (chip), even if some cores are not operated, by configuring to bypass and exclude the cores with faults founded either through monitoring the operational status of each of the multiple cores or chip testing during the manufacturing process, from the respective operations.

Furthermore, it is another objective of the present invention to expand the scope of performance harvesting to a system comprising a board in which multiple chips are configured to preform predetermined operations independently, or a shelf or a rack in which multiple boards are configured to preform predetermined operations independently.

Furthermore, it is another objective of the present invention to enhance yields of the manufacturing process of a chip embedding multiple cores in a matrix form, and to extend the lifetime of the chip during its usage.

Additionally, it is another objective of the present invention to extend the lifetime of the boards, shelves, or racks for a system comprising a board in which multiple chips are configured to be arranged in a matrix structure or comprising shelves or racks in which multiple boards are configured to be arranged in a matrix structure.

Furthermore, it is another objective of the present invention to be useful for applications such as hashing (including SHA-256, SHA-512, Proof-of-work, etc.) or encryption algorithm used in internet banking, proof-of-work in a bitcoin, digital signatures, and learning engines used in artificial intelligence, where numerous cores are configured to perform independent computations, respectively.

It is characterized in that a method of performance harvesting in accordance with one embodiment of the present invention, comprises detecting bad core configured to detect fault in at least one or more of multiple cores in the device comprising at least one core group where the multiple cores are arranged in a matrix structure, and harvesting performance configured to bypass operations of at least one or more of the fault detected cores among the multiple cores and demonstrate the performance of the device with remaining normally operated cores without fault among the multiple cores.

It is characterized in that the detecting of bad core is to detect fault in each core by performing test including at least one or more of a BIST (Built-In Self Test), a degradation test, a functional test, or a combination thereof.

It is characterized in that the detecting of bad core further comprises scheduling test configured to activate a test scheduler to execute the test, generating test pattern configured to generate test patterns according to the test scheduling, and monitoring response configured to input the generated test patterns into each of the multiple cores, compare a response from each of the multiple cores with an expected response, and detect any discrepancy.

It is characterized in that the monitoring of response is configured to determine that no fault is detected in a core, if a detected fault rate for the core is below a predetermined fault rate, or even if a fault is detected in the core as long as it is possible for the core to correctly execute predetermined tasks functionally, and enable predetermined tasks to be performed with the core in the harvesting of performance.

It is characterized in that the harvesting of performance is configured to demonstrate the performance by ignoring results of tasks assigned to the bad core where the fault is detected, and independently performing the assigned tasks with the remaining cores.

It is characterized in that the harvesting of performance is configured to provide a modified clock to the bad core in which a fault is detected, and bypass input data to output data for the core, wherein the modified clock is a clock generated by masking, resetting, gating, or a combination thereof, to a normal clock provided to the core in a normal state.

Furthermore, it is characterized in that a device of performing performance harvesting in a core matrix structure, comprises at least one or more core group configured to be arranged multiple cores in a matrix structure, and a control logic part configured to bypass operations of at least one or more fault detected cores among the multiple cores and demonstrate the performance with remaining cores without fault among the multiple cores.

It is characterized in that the control logic part is configured to comprise a test manager configured to detect fault at least one or more cores among the multiple cores, a task manager configured to manage allocating tasks to the multiple cores according to the detected fault, and a bad core manager configured to record and manage the detected fault.

It is characterized in that the test manager is configured to detect fault in each core by performing test including at least one or more of a BIST (Built-In Self Test), a degradation test, a functional test, or a combination thereof.

It is characterized in that the test manager is configured to comprise a test scheduler configured to perform test scheduling for executing the test, a test pattern generator configured to generate test patterns according to the test scheduling, and a response monitor configured to detect any discrepancy by inputting the generated test patterns into each of the multiple cores and comparing a response from each of the multiple cores with an expected response.

It is characterized in that the response monitor is configured to determine that no fault is detected in a core, if a detected fault rate for the core is below a predetermined fault rate, or even if a fault is detected in the core as long as it is possible for the core to correctly execute predetermined tasks functionally, and enable predetermined tasks to be performed with the core in the harvesting of performance.

It is characterized in that the task manager is configured to demonstrate the performance by ignoring results of tasks assigned to the bad core where the fault is detected, and independently performing the assigned tasks with the remaining cores.

It is characterized in that the control logic part further comprises a clock controller configured to provide a modified clock to the bad core in which the fault is detected, wherein the clock controller is further configured to bypass input data to output data for the core by providing the modified clock to the bad core in which the fault is detected, and wherein the modified clock is a clock generated by masking, resetting, gating, or a combination thereof, to a normal clock provided to the core in a normal state.

As described above, a device embedding multiple cores in a matrix form and enabling each of the multiple cores to be independently operated is effective for demonstrating predefined performance by harvesting performance with operations of remaining cores, even if a specific core fails to operate due to a defect, Furthermore, a chip in accordance with the present invention is configured to exclude defected cores from operations by bypassing the cores from the operations, in which the defect is detected through monitoring the operational status of each of the multiple cores or through chip testing during the manufacturing process, and thereby the chip can produce desired computational result through the performance exhibited by normally operated remaining cores, even if some cores fail to operate, so that the chip is effective to extend its lifetime, Furthermore, the method in accordance with the present invention enables the scope of performance harvesting to expand a system configured to comprise a board configured to independently perform a specified computation with each of multiple chips, a shelf or a rack configured to independently perform a specified computation with each of multiple boards.

Furthermore, a chip embedding with multiple cores in a matrix form according to the present invention is effective to enhance yields in manufacturing process of a chip and extend lifetime of the chip in a process of usage.

Furthermore, according to the present invention, for a system comprising the board composed of multiple chips in a matrix structure, or the shelf or rack composed of multiple boards, it is effective to extend lifetime for the board, shelf, or rack.

Additionally, a method and a device in accordance with the present invention can be effectively utilized in hashing (including SHA-256, SHA-512, Proof-of-work, etc.) or cryptography algorithm used for internet banking, proof-of-work for cryptocurrencies (i.e., a bitcoin), digital signatures, and so on, or in learning engines of artificial intelligence, where numerous cores independently operate the entire complex computations.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Figure 1:
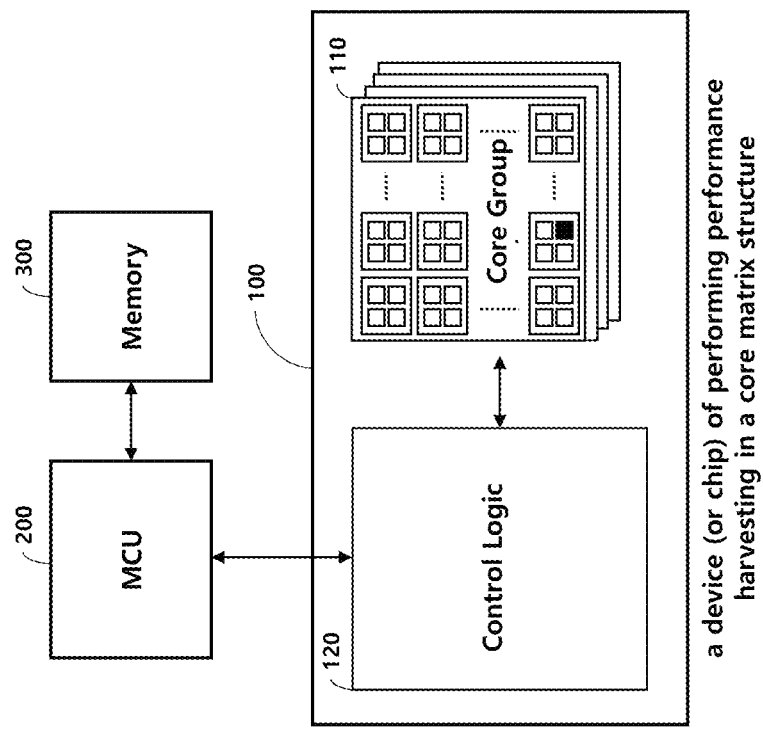
FIG. 1 is a drawing illustrating a concept of the configuration of a device 100 for performing performance harvesting according to an embodiment of the present invention.

Hereinafter, preferred embodiments of a method of performance harvesting and a device performing the method in a core matrix structure of the present disclosure are described in detail with reference to the accompanying drawings. The identical reference numerals in the drawings indicate the same components. Furthermore, specific structural or functional descriptions regarding the preferred embodiments of the present disclosure are only provided for the purpose of illustratively describing the embodiments according to the present disclosure. Unless otherwise defined, all terms used herein, including technical or scientific terminologies, have the same meanings as commonly understood by those ordinary skilled in the technical field to which the present disclosure pertains. Terms such as those defined in commonly used dictionaries, should be interpreted to have the meanings consistent with their meanings in the context of the relevant art, and it is desirable not to interpret the terms in an idealized or overly formal sense unless explicitly defined in this specification.

In the present disclosure, a chip comprising a plurality of cores arranged in a matrix structure, a board comprising a plurality of the chips arranged in a matrix structure, and a system further expanded from the boards to shelves or racks, are also acceptable to interpret as the term of device. Furthermore, the term of a control logic is used interchangeably with terms of a control unit, a control part, a controller, a control module, etc., and the term of a core group is used interchangeably with terms of a core unit, a core part, a core module, etc.

Furthermore, the term of bad core means a faulty core, and wherein the faulty core includes the cases that the core is completely non-operational, and the error rate exceeds a certain threshold so that the care cannot be functioned. For example, if a core exhibits a certain error rate in Built-In Self-Test (BIST) but passes specific functional tests, it may have a fault but might not be registered as a bad core and could still be used normally.

FIG. 1 is a drawing illustrating a concept of the configuration of a device (or a chip, hereinafter referred to as a device or a chip for performing performance harvesting) 100 for performing performance harvesting in a core matrix structure according to an embodiment of the present invention.

As shown in FIG. 1, the device 100 of performing performance harvesting according to an embodiment of the present invention comprises at least one or more core group 110 consisting of multiple cores in a matrix structure and a control logic 120.

The device 100 performing performance harvesting according to an embodiment of the present invention is operated by an MCU (Main Control Unit) 200 which is located outside. And the MCU 200 communicates with the control logic 120 by utilizing memory 300, and operates the device 100 of performing performance harvesting, so that it enables desired operations or tasks to be efficiently performed.

The core group 110 is configured by arranging numerous cores in a matrix form, and each core is designed to operate independently to perform required computations or tasks.

As such, the task of at least one or more core group 110, where multiple cores are regularly arranged, is managed by the control logic 120, and furthermore, the control logic 120 is configured to perform test management, task management, bad core management, and clock control for the device 100 of performing performance harvesting according to an embodiment of the present invention.

Hereinafter, a more detailed explanation for the device 100 of performing performance harvesting according to an embodiment of the present invention is provided.

Figure 2:
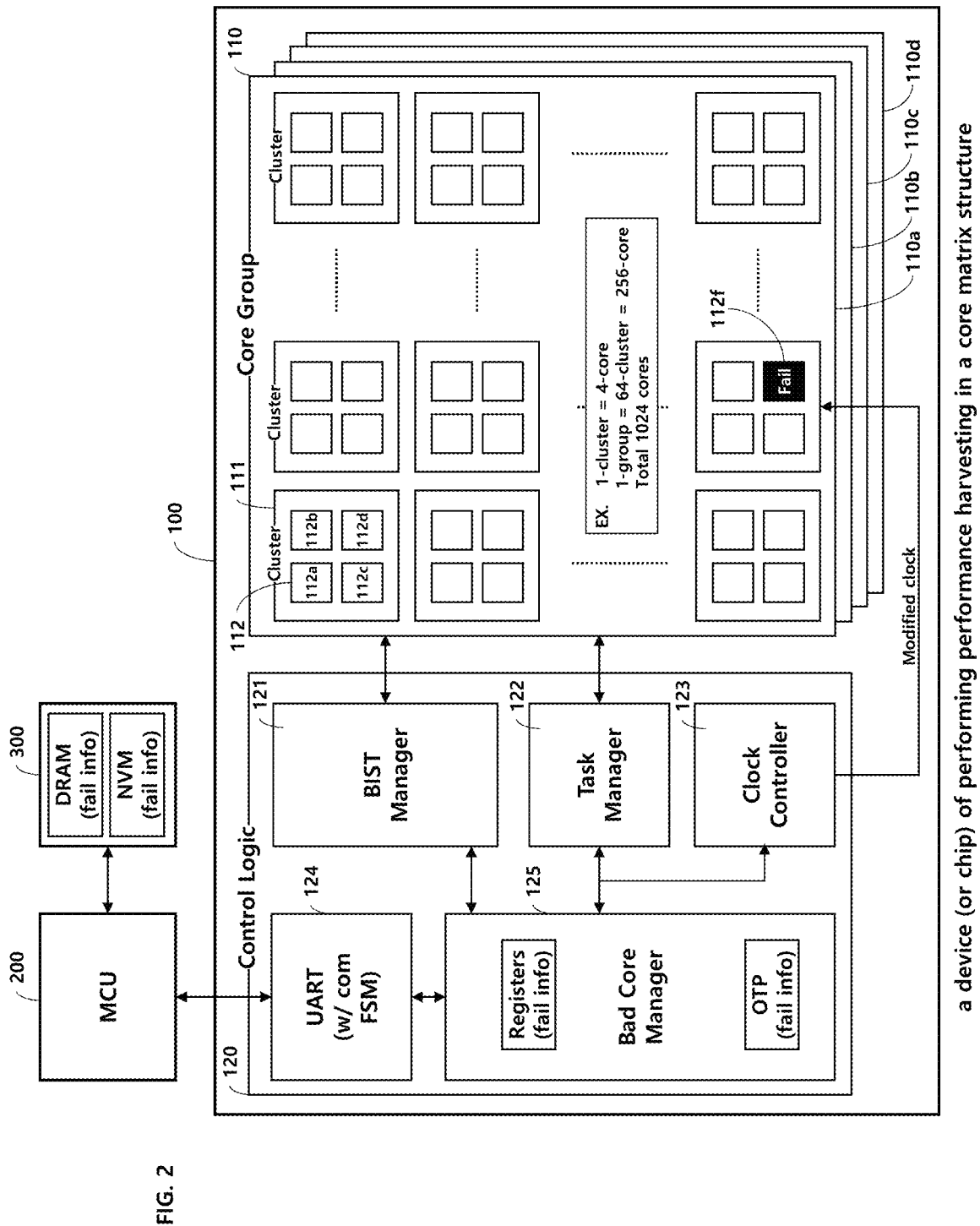
FIG. 2 is a drawing illustrating a detailed structure of the configuration of a device 100 for performing performance harvesting according to an embodiment of the present invention.

FIG. 2 is a drawing illustrating a detailed structure of the configuration of a device 100 for performing performance harvesting according to an embodiment of the present invention.

As shown in FIG. 2, the device 100 of performing performance harvesting according to the present invention is configured to comprise at least one core group 110 i.e., 110a to 110d and a control logic 120. In FIG. 2, four core groups are depicted, but the actual number of core groups may naturally be either less than four or more than four, as deemed appropriate. That is, thousands of cores can be equipped.

Furthermore, the performance harvesting device 100 of the present invention is utilized and operated in various application fields as needed, with the MCU 200 utilizing memory 300.

At least one or more than core group 110 can be provided e.g., 110a to 110d, and each core group 110 is configured to include at least one or more clusters 111. Furthermore, each of clusters 111 mentioned above is configured to include at least one or more cores 112, or 112a to 112d. However, the configuration of the clusters is not limited to a specific number of cores and can be grouped according to various purposes.

For example, a core group 110 according to the present invention can be defined as one with 64 clusters, in which each of the clusters consists of four cores. In this case, a total of 256 cores can be equipped within a single core group. Furthermore, for example, with a chip consisting of four core groups 110a, 110b, 110c, and 110d, a total of 1024 cores can be embedded in the chip.

In the configuration or form of a core group 110, the configuration of clusters, the number of core groups, and the total number of cores are not limited to the examples provided above. It is possible to configure various configuration of clusters, the number of core groups, and the total number of cores.

As demonstrated, a single chip can embed 1024 cores, thereby becoming a system or device capable of performing a vast amount of computations or tasks Furthermore, depending on the scale of the system, it is also possible to implement various devices equipped with hundreds to thousands of cores.

To implement a specific service by utilizing the performance harvesting device 100 according to the present invention, additional MCU 200 and memory 300 are equipped at the system level to provide the service, and can communicate with and operate the performance harvesting device 100 according to the present invention. Through the communication between the MCU 200 and the performance harvesting device 100, it is possible to rapidly process highly complex hashing (including SHA-256, SHA-512, Proof-of-work, etc.) or encryption algorithms, or artificial intelligence algorithms.

When operating the device, the MCU 200 reads fault information from the OTP (One-Time Programmable) part in the Bad Core Manager 125. The OTP part contains fault information discovered through BIST during chip manufacturing process. Afterward, if a new fault is discovered through the TEST manager, the corresponding fault information is stored in the NVM. The MCU 200 compares the fault information read from the OTP part with the fault information stored in the NVM, loads the compared result into the DRAM, and stores the compared result in the registers of the Bad Core Manager 125 via UART 124. The Task Manager 122 and Clock controller 123 utilize the fault information stored in the registers to manage tasks and control the clock.

In the core group 110, each cluster or core is interconnected. However, if a specific core or cluster do not operate due to a fault, it can be configured that the clock operating corresponding core or cluster is modified, and the modified clock can be provided to the respective core or cluster, so that corresponding operations or tasks can be bypassed.

Logically, each of the cores 112 can be configured to perform only the role of receiving the output from the preceding core and transmitting the received output to the next core if the clock provided to the core is masked, reset, or gated so as to be disabled. So, the core can be bypassed. If the clock is not disabled, the corresponding core is configured to receive the result from the preceding core, process the received result, and then transmit the processed result to the next core. If disabling the clock of the core, the core is configured to process the RTL (Register Transfer Level) pipeline of the core not to be operated, thereby reducing unnecessary power consumption in the core (i.e., a faulty core). In addition to masking, the clock can also be modified through clock gating or clock reset.

Each core includes a combinational logic circuit, a sequential logic circuit, a register file, and so on. These are all configured to execute the tasks together intended by the core. However, each core can be configured to be customized to meet the specific needs of a particular application. In particular, cores can be custom-designed to meet the requirement of a device such as a high-performance or a low-power device.

Therefore, the structure of cores in a specific chip can be configured to various form depending on a design requirement and desired functionality. Typically, the structure of a core can be configured to include a control unit, an arithmetic logic unit, registers, a memory interface, input/output interfaces, a bus interface, and so on. Wherein, the control unit and arithmetic logic unit can be designed as a general-purpose or a customized form, but detailed descriptions are omitted as they are unrelated to main technological concepts of the present invention. Furthermore, the roles of registers, memory interfaces, input/output interfaces, and bus interfaces are well-known in the art, so detailed explanations are omitted.

The examples provided above regarding the number of core groups, clusters, and cores are merely illustrative, and the number can be configured to be various according to requirements and be operated. For instance, if only one core is allocated to each cluster, there may be no need to distinguish between cores and clusters.

The control logic part 120 comprises a test manager 121, a task manager 122, a clock controller 123, an UART part 124), and a bad core manager 125. Wherein the control logic part 120 is configured to bypass operations of at least one or more fault detected cores among the multiple cores and demonstrate the performance with remaining cores without fault among the multiple cores.

Wherein, the test manager 121 is configured to control the test sequences for testing the core groups 110, generate test vectors, and analyze responses for the testing. That is, the test manager is configured to perform various tasks such as generating test patterns according to the test sequences, checking test results, and controlling the test procedures. The test manager 121 provides helps for automating the test procedures, reducing the hassle of manually inputting test vectors from external sources, and ensuring that the core group is manufactured with high quality and high stability. In the case of BIST, since the logic required for BIST is integrated together into the core itself, the cores employing BIST have the disadvantage of increasing complexity due to the inclusion of the logic. The test manager is configured to detect fault at least one or more cores among the multiple cores.

The task manager 122 takes roles of managing the tasks performed by the core group 110. In other words, the task manager 122 is configured to enable the resources of the cores to be monitored by providing information about the operations or tasks performed by the core group 110 to the MCU, and the MCU allows for assigning the operations or tasks processed by the core or setting priorities through the task manager 122. That is, the task manager 122 is configured to manage allocating tasks to the multiple cores according to the detected fault. And The task manager 122 is further configured to demonstrate the performance by ignoring results of tasks assigned to the bad core where the fault is detected, and independently performing the assigned tasks with the remaining cores.

The clock controller 123 takes roles of controlling the provision of a clock to each cluster 111 or core 112 in the core group 110. The device 100 implementing the performance harvesting according to an embodiment of the present invention is configured to comprise blocking the provision of the clock to the core or cluster where faults have occurred, thereby preventing the faulty core or cluster from processing the operations or tasks further. Furthermore, even if each core affected by a fault is not operational due to the absence of clock supply, the affected core is configured to comprise bypassing the input data of the corresponding core to output data in order to allow neighboring cores to independently perform operations or tasks without interruption.

Furthermore, the clock controller 123 is also configured to include providing a modified clock, which is achieved through masking, resetting, gating, or a combination thereof, for a bad core that a fault is detected. That is, the clock controller 123 is configured to provide a modified clock to the bad core in which the fault is detected. Wherein the clock controller is further configured to bypass input data to output data for the core by providing the modified clock to the bad core in which the fault is detected, and wherein the modified clock is a clock generated by masking, resetting, gating, or a combination thereof, to a normal clock provided to the core in a normal state.

The UART (Universal Asynchronous Receiver and Transmitter) 124 is a serial communication protocol used for communication between devices. It is used for communication between the device 100 of performing performance harvesting according to the present invention and the MCU 200.

The bad core manager 125 is configured to manage the faults occurred in the clusters or cores of the core group 110. Wherein the faults are programmed (recorded) in the OTP (one-time programmable) memory. When the test manager 121 identifies a fault occurred in a specific core or cluster of the core group during the manufacturing process, it records the ID of the corresponding core or cluster in the OTP memory. And then the clock controller 123 is configured to take roles of providing a modified clock modified by performing masking, resetting, gating, or a combination thereof to the corresponding clock, not to be supplied to the corresponding core or cluster, and preventing the clock from being supplied to the core or cluster.

Furthermore, the bad core manager 125 is configured to comprise registers to store fault information received from the MCU, provide the latest fault information to the task manager 122 and the clock controller 123 for task management and clock control.

For example, if a specific core 112$f$ within the core group is failed, the corresponding core 112$f$ is prevented from operating by masking, resetting, or gating the clock supplied to the core 112$f$. Meanwhile, clock controller the structure that the clock is supplied to each cluster individually, the corresponding cluster can be excluded from operation or computation by controlling the supply of a clock to the cluster containing the core 112$f$.

If the number of cores included in the core group 110 is large, each core must be equipped with a separate clock line. In this case, an excessive number of clock lines leads to increase the wiring area or complexity, and the complex clock lines can potentially increase the power consumption as well. In this case, it is preferable to construct a clock tree, supply a normal clock to the entire clock lines in the clock tree, branch the clock lines to each core, but individually disable the branched clock lines for the cores that a fault is occurred.

Hereafter, in the case that a fault is occurred in a specific core, a structure for bypassing the data path between the preceding and succeeding cores of the specific core is described.

Hereafter, the bypass structure presented in the invention is just one example of the embodiments. It is preferable in the present invention to configure the input output data paths in such a way that the core where a fault occurs is excluded from the computation and operated without affecting the operations of other cores.

Figure 3:
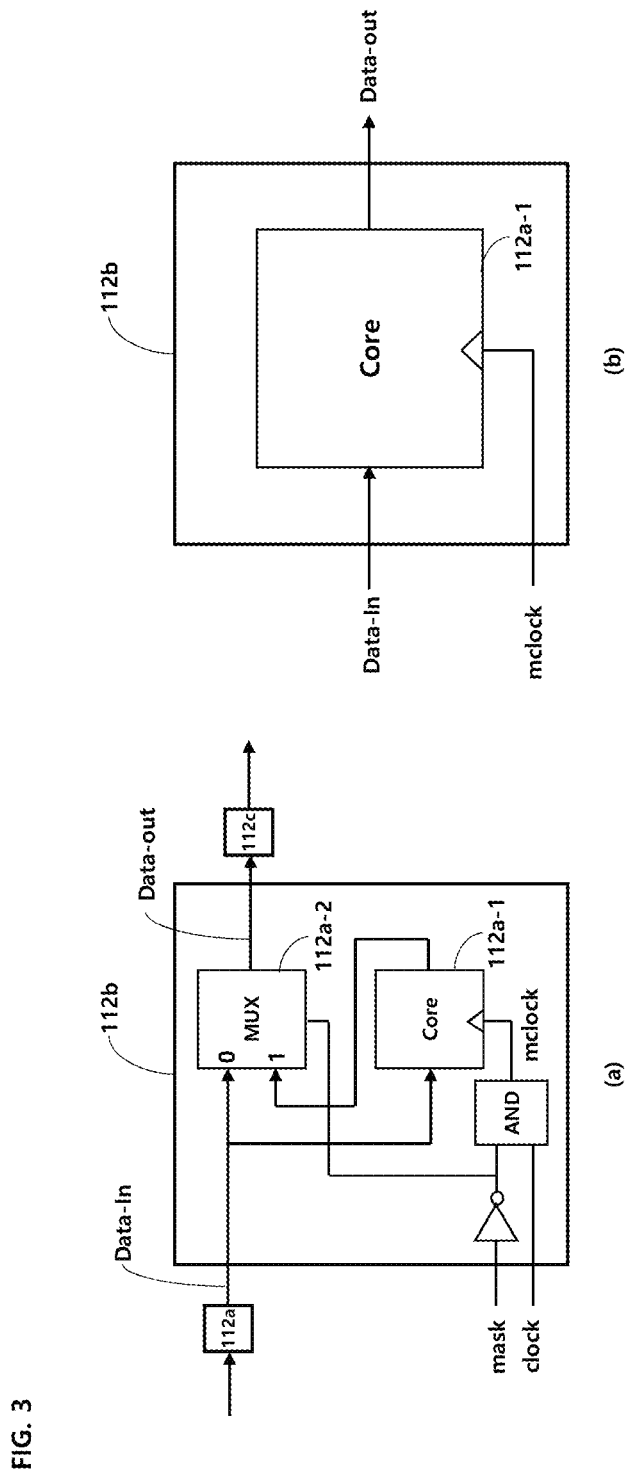
FIG. 3 is a drawing illustrating (a) data paths between adjacent cores and (b) data path when each of the cores operates independently, in the case of occurring a fault in a specific core in a device 100 for performing performance harvesting according to an embodiment of the present invention.

FIG. 3 is a drawing illustrating (a) input/output data paths between adjacent cores and (b) input/output data paths when each of the cores operates independently, in the case of occurring a fault in a specific core in a device (chip) 100 for performing performance harvesting according to an embodiment of the present invention.

As shown in (a) of FIG. 3, each core according to the present invention is configured to include an essential core responsible for operations for each core 112$a$-1 and a bypass circuit 112$a$-2, AND, etc. for the input-output data paths.

In more detail, when the clock connected to a corresponding core is masked for transmitting and receiving data between adjacent cores 112$a$ and 112$b$, each core 112$b$ is configured to include not only an AND circuit to disable the clock connected to the core, but also a circuit 112$a$-2 to select one of the outputs whether to output the data inputted from the previous core to the next core as it is, or output the data outputted from the essential core 112$a$-1, which operates the data inputted from the previous core.

Herein, the essential core 112$a$-1 refers to a part executing the essential functionality associated with the operations or tasks that a specific core executes. In addition, when the mask signal is low, the essential core 112$a$-1 outputs the results executing its function. When the mask signal is high, a circuit 112$a$-2 that performs the function of outputting the input data (Data_in) directly to the output data (Data_out) is need to be included.

The core according to the present invention the essential core 112$a$-1 and a bypass circuit. The bypass circuit can be configured in various ways and can be provided by the clock controller 123 or provided in each core. Wherein, the masked clock refers to one type of modified clock (mclock), and gating or resetting signals can also be used instead of masking, but in practice, masking, gating, and resetting have substantially the equivalent functionality.

In addition, as shown in (b) of FIG. 3, each core can be configured to independently receive certain tasks assigned by the task manager 122 and execute the tasks. In this case, if a fault occurs, the operation of the affected core can be disabled using a masked, gated, or reset clock (mclock).

Furthermore, by managing the assignment of tasks to cores with faults through the task manager 122 in the control logic part 120 of the device (chip) 100 according to the present invention, it is possible to exclude cores with faults from operations in the event of a fault.

Basically, each core proceeds with the given computation based on the input data (Data_in), compares the computation result with given conditions, and if the conditions are satisfied, the computation result is then transmitted as output data (Data_out).

For example, a device receives 256-bits of input data, internally alters the input data into 32-bit input data, and assigns tasks to perform the operation (task) of $2^{32}=4,294,967,296$ to the device, if there are 1024 of cores in the device, the instructions to perform $2^{22}$ of tasks (or operations) are divided among the 1024 cores and distributed to each of 1024 cores, once each core completes $2^{22}$ operations, then the device receives the next 256-bit input data to proceed with the operations again. If one core among 1024 cores fails, the task manager 122 adjusts to distribute the task of $2^{32}$ originally assigned to the 1024 cores into the remaining 1023 cores.

The technical features of this invention are well-suited for applications like mining or AI computations, and the operational methods of the cores may be different depending on each application field.

In the case of memory, if a fault occurs in a cell, the role is replaced by another cell. The chip according to the present invention can be operated in a way that in the event of a faulty core, tasks can be reassigned to other cores, or the results produced by the faulty core can be ignored. Therefore, the present invention discloses a different concept from managing bad cells in memory.

According to the present invention, if faults occur in some cores, the overall computing capability decreases accordingly. However, the chip remains usable despite the faults in some cores, thereby extending the lifetime of the chip, reducing costs, and enhancing yield.

It is preferable to consider the diversity in the configuration of cores comprehensively as encompassed by the present invention. That is, according to the present invention, the cores are designed to comprise not only the essential core with RTL-level pipeline circuits but also separately a control part, memory interfaces, input and output interfaces, and bus interfaces. Thus, there's no need to limit the structure of a particular core to a specific architecture.

In one embodiment of the present invention, the bypassing of faulty cores can indeed be executed by the clock controller 123 and configured in other ways to achieve the same effect, so it is not strictly confined by FIG. 3. In addition, if separate clocks are connected to each of clusters into which are grouping multiple cores, rather than connecting a separate clock to each core, it is possible to generate masking, gating, or reset signals for disabling or enabling the supply of the corresponding clock for each cluster.

Furthermore, while the present disclosure exemplifies the cases where each core is unidirectionally connected to adjacent cores, it is also possible for the cores to be bidirectionally connected to each other or even not connected at all. However, it is preferable for each core to perform independent operations without being influenced by the operation results of adjacent cores.

Figure 4:
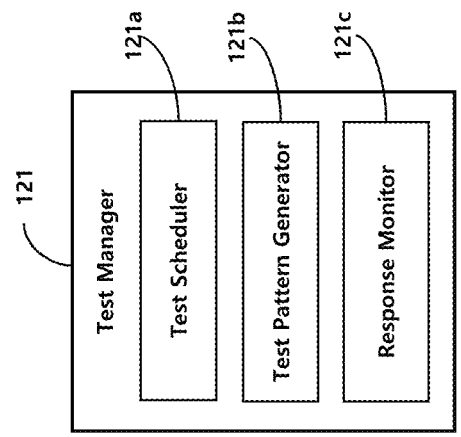
FIG. 4 is a drawing illustrating a configuration of a test manager in a device 100 for performing performance harvesting according to an embodiment of the present invention.
Figure 5:
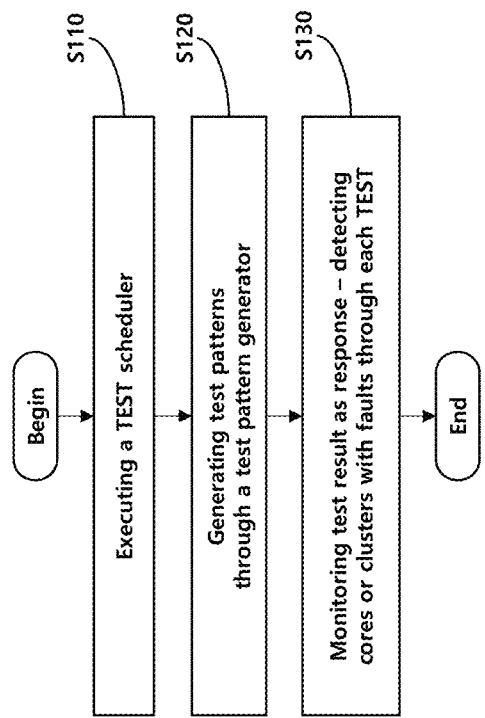
FIG. 5 is a flowchart depicting operation of a test managing part in a device 100 for performing performance harvesting according to an embodiment of the present invention.

FIG. 4 is a drawing illustrating a configuration of a test manager 121 in a device (chip) 100 for performing performance harvesting according to an embodiment of the present invention, and FIG. 5 is a flowchart depicting operation of a test managing part 121 in a device (chip) 100 for performing performance harvesting according to an embodiment of the present invention.

In the present disclosure, the TEST manager 121 is configured to include at least one of the BIST (Built-In Self Test), functional test, and degradation test.

As illustrated in FIG. 4 and FIG. 5, the TEST manager 121 can be configured to comprise a test scheduler 121a, a test pattern generator 121b, and a response monitor 121c.

The test scheduler 121a is configured to control the sequences of test operations for the internal components of the cores by using at least one of a BIST, a functional test, and a degradation test. The test scheduler 121a is configured to take roles of controlling applying a series of generated test patterns to the circuits within the core and scheduling the test sequence (process) to verify if the core operates correctly. In BIST, the core is divided into smaller segments, and each segment is independently tested using its own test pattern. The test scheduler 121a is configured to coordinate the timing and execution of each test to ensure that the overall test process is performed according to the correct sequence and effectively. The TEST scheduler is executed in S110. The test scheduler is configured to perform test scheduling for executing the test.

The test scheduler 121a is employed in application domains where an error for a single component could lead to severe consequences and thus high reliability is crucial, by employing BIST to test the internal components of the core, faults can be detected in the chip before the chip is actually deployed for use, thereby increasing an overall reliability through BIST and reducing risks incurred by faults.

Hereinafter, the test manager 121 is configured to generate the test patterns through the test pattern generator 121b in accordance with the test scheduler 121a, as shown in S120. It is preferable for the test patterns to be described to enable the internal components of each core to be individually and independently tested. Additionally, in the present invention, it is essential to conduct a test whether each core produces the expected result for a specific input.

The test pattern generator 121b is configured to generate test patterns used to test each core of the chip, and the test patterns are designed for detecting any faults occurring within the cores. generated in various ways, including pseudo random patterns, patterns generated according to a specific predetermined rule, or combinations thereof. The test pattern generator is configured to generate test patterns according to the test scheduling.

Then, the test manager 121 is configured to monitor response through the response monitor 121c when the generated test patterns are input, as shown in S130. That is, the test manager 121 monitors whether the desired responses are output when independent test patterns are input for each component. In BIST, when faulty cores or clusters are detected by the BIST logic, the test results may be considered or determined as satisfactory for fault rates of less than 0.3%. But the threshold for such fault rates varies depending on the tasks being performed, and it is also possible to operate the chip with a zero-fault tolerance, where no faults are allowed at all. That is, the response monitor 121c is configured to detect any discrepancy by inputting the generated test patterns into each of the multiple cores and comparing a response from each of the multiple cores with an expected response. And the response monitor is further configured to determine that no fault is detected in a core, if a detected fault rate for the core is below a predetermined fault rate, or even if a fault is detected in the core as long as it is possible for the core to correctly execute predetermined tasks functionally, and enable predetermined tasks to be performed with the core in the harvesting of performance.

The fault rate of BIST depends on various factors such as the design and implementation of the BIST. Hence, the fault rate relies on factors such as the complexity of the circuit to be tested, the quality of the test patterns, and the error coverage of the test. BIST is known as a highly reliable test technique capable of extensively detecting errors in digital circuits. The use of BIST can enhance the overall reliability of integrated circuits by detecting errors that may not be detected in application domains demanding high reliability.

However, like other testing techniques, the BIST is not perfect and may occasionally fail to detect certain faults or generate false positives. The failure rate of the BIST can be reduced by optimizing the design and implementation of the BIST technology, using high-quality test patterns, and increasing fault coverage through multiple tests.

On the other hand, the response monitor 121c is configured to utilize error detection and correction codes.

The test manager 121 is designed independently of the cores responsible for the functionality of the chip. This means that the test manager 121 can be activated and executed independently of the normal operations of the chip. Therefore, it enables comprehensive testing without influencing on the functionality of the chip.

As a whole, the failure rate of the BIST varies depending on specific circumstances and implementations, but it is generally considered as a reliable and effective testing technique for digital circuits.

Figure 6:
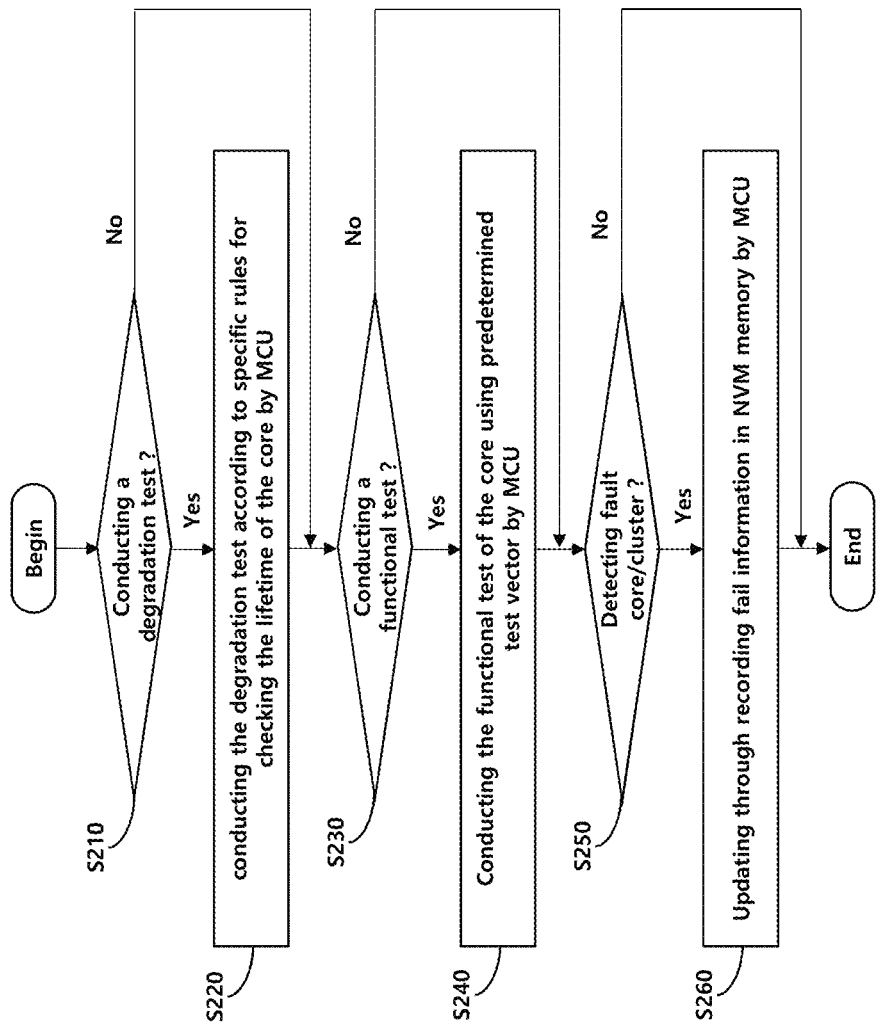
FIG. 6 is a flowchart depicting a process of conducting chip degradation test and functional test in a device 100 for performing performance harvesting according to an embodiment of the present invention.

FIG. 6 is a flowchart depicting a process of conducting chip degradation test and functional test in a device (chip) 100 for performing performance harvesting according to an embodiment of the present invention.

As shown in FIG. 6, for a device 100 of performing performance harvesting according to one embodiment of the present invention, in the MCU 200, a degradation test is conducted in S220 based on specified rules according to periodically or non-periodically requests in S210 for checking the lifetime of the core.

Additionally, the MCU (200) is configured to conduct functional tests of the cores according to specified rules in S240 with periodical or non-periodical requests in S230.

Of course, if the degradation test and functional test are not requested, the respective testing processes are skipped.

The degradation test and functional test can be performed by using predetermined test vectors. The rules for conducting each test can be determined periodically or non-periodically. For example, the tests could be performed whenever a specified time interval arrives, where the specified time interval is predefined, and it is possible to perform specified tests before activation of the chip, whenever the system initiates the chip. Of course, the rules can be set as desired.

If the degradation test or functional test detects the occurrence of a bad core or bad cluster in S250, the MCU 200 is configured to update the fault information for the respective bad core or bad cluster by recording the information in an NVM (non-volatile memory) in S260.

Such updated fault information is commanded to the task manager 122 and the clock controller 123 via the bad core manager 125 comprised as a part of the control logic 120 of the chip, before the MCU activates the chip, so that the corresponding core or cluster could be excluded from performing operations or tasks, or the operations or tasks of the corresponding core or cluster are blocked by masking, reset, or gating the clock.

Figure 7:
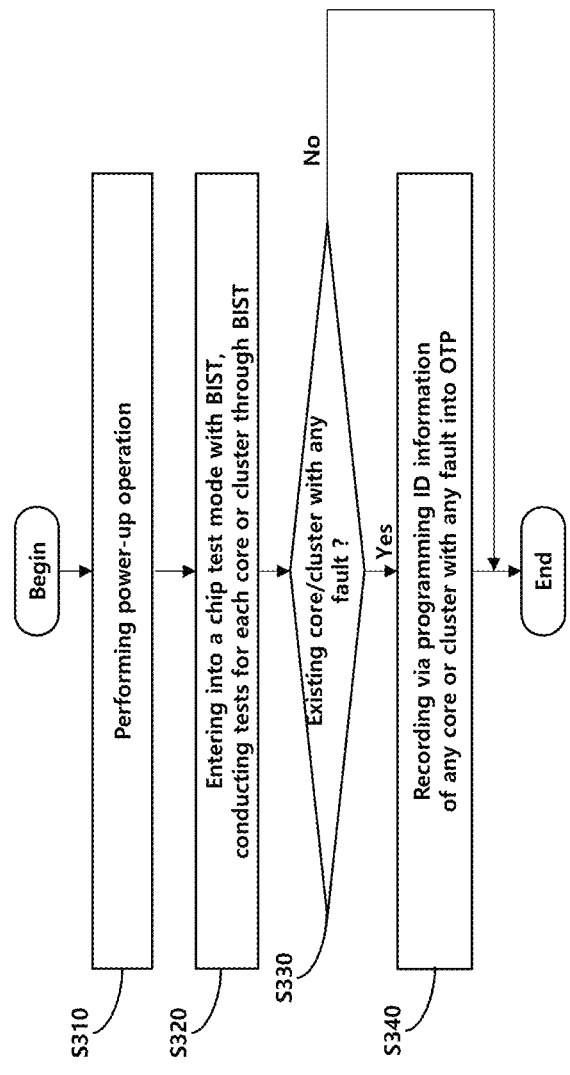
FIG. 7 is a flowchart depicting a chip test sequence of Built-In Self-Test (BIST) in a device 100 for performing performance harvesting according to an embodiment of the present invention.

FIG. 7 is a flowchart depicting a chip test sequence of Built-In Self-Test (BIST) in a device (chip) 100 for performing performance harvesting according to an embodiment of the present invention.

As shown in FIG. 7, a process of performing BIST chip testing during the chip manufacturing process of a device 100 of performing performance harvesting according to one embodiment of the present invention begins with the operation of powering up in S310.

Subsequently, the chip enters into the chip test mode through BIST in S320. The specific process of performing chip testing via BIST is described in detail as reference to FIG. 5.

In other words, when the power is turned on for the device 100 of performing performance harvesting at S310, the device for conducting performance harvesting with the matrix structure begins the operations in S310.

After turning on the power, the device 100 of performing performance harvesting then enters into the chip test mode through BIST. Through BIST, tests are conducted for each core or cluster in S320. If any cores with faults are discovered in S330 according to results of the tests, the fault information is constructed in S340 by the bad core manager.

The fault information is programmed and recorded in the OTP (One-Time Programmable) memory. The data recorded in the OTP memory during the chip test represents the fault information programmed the test results occurred during the chip manufacturing process into the OTP memory.

The OTP memory is a non-volatile memory that is programmed once during the manufacturing process and retains the data even when power is turned off. The OTP memory is used to store the test results for matrix formed multiple cores on the chip.

Meanwhile, the data recorded in the OTP memory consists of device-specific information such as calibration data, serial numbers, encryption keys, and setting information. Storing the information in OTP memory allows for secure and reliable access by the chip without the need for external storage.

Figure 8:
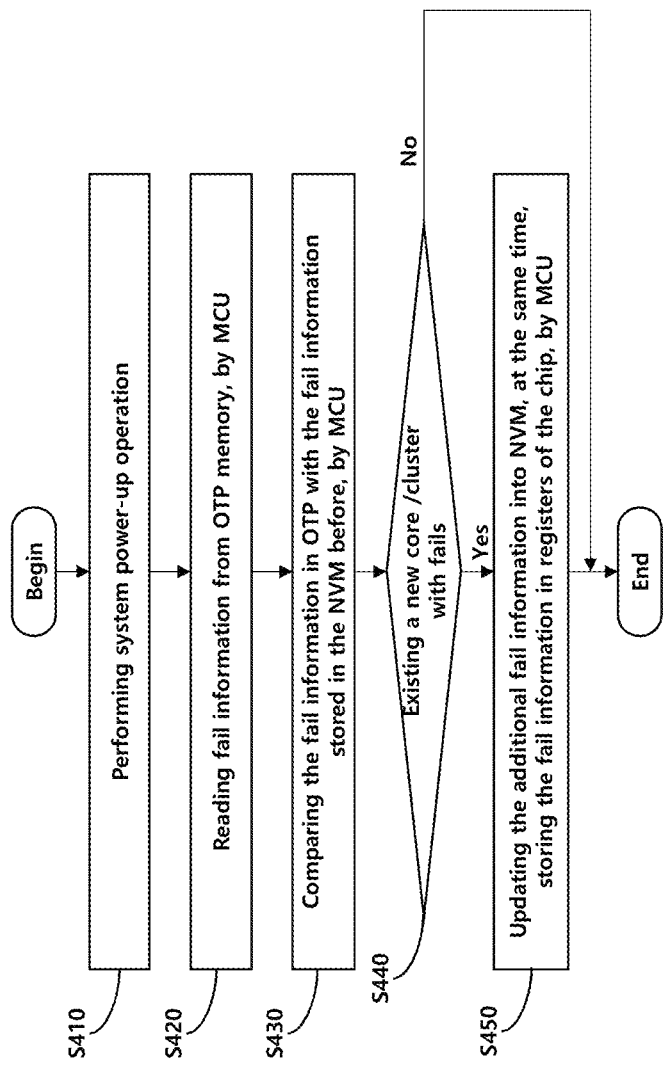
FIG. 8 is a flowchart depicting a power-up sequence of a device 100 for performing performance harvesting according to an embodiment of the present invention.

FIG. 8 is a flowchart depicting a power-up sequence of a device (chip) 100 for performing performance harvesting according to an embodiment of the present invention.

As shown in FIG. 8, when power is turned on for a system incorporating the device of performing performance harvesting according to one embodiment of the present invention, an MCU 200, a memory 300, and a chip 100 performing performance harvesting begin their operations in S410.

Subsequently, the MCU 200 reads the fault information from each of chips in S420, wherein the fault information is recorded in the OTP memory in a chip test process performed during the initial chip manufacturing process.

The MCU 200 is configured to compare the fault information read from OTP memory with the previously stored fault information in NVM, as shown in S430.

If it is determined from the comparison that new bad cores or clusters exist in S440, the MCU 200 updates the information by recording the information for the new bad cores or clusters in the NVM 300 and simultaneously stores the information in the registers of the corresponding chip, as shown in S450. The registers are comprised within the bad core manager 125 or placed at any other arbitrary location. The specific location where the registers placed is not crucial.

Through these processes, the MCU 200 is configured to communicate with the device 100 of performing performance harvesting according to the present invention, check and manage in real-time or non-real-time whether bad cores or clusters have occurred in the chip, and thus performing overall performance harvesting perform overall performance harvesting.

Figure 9:
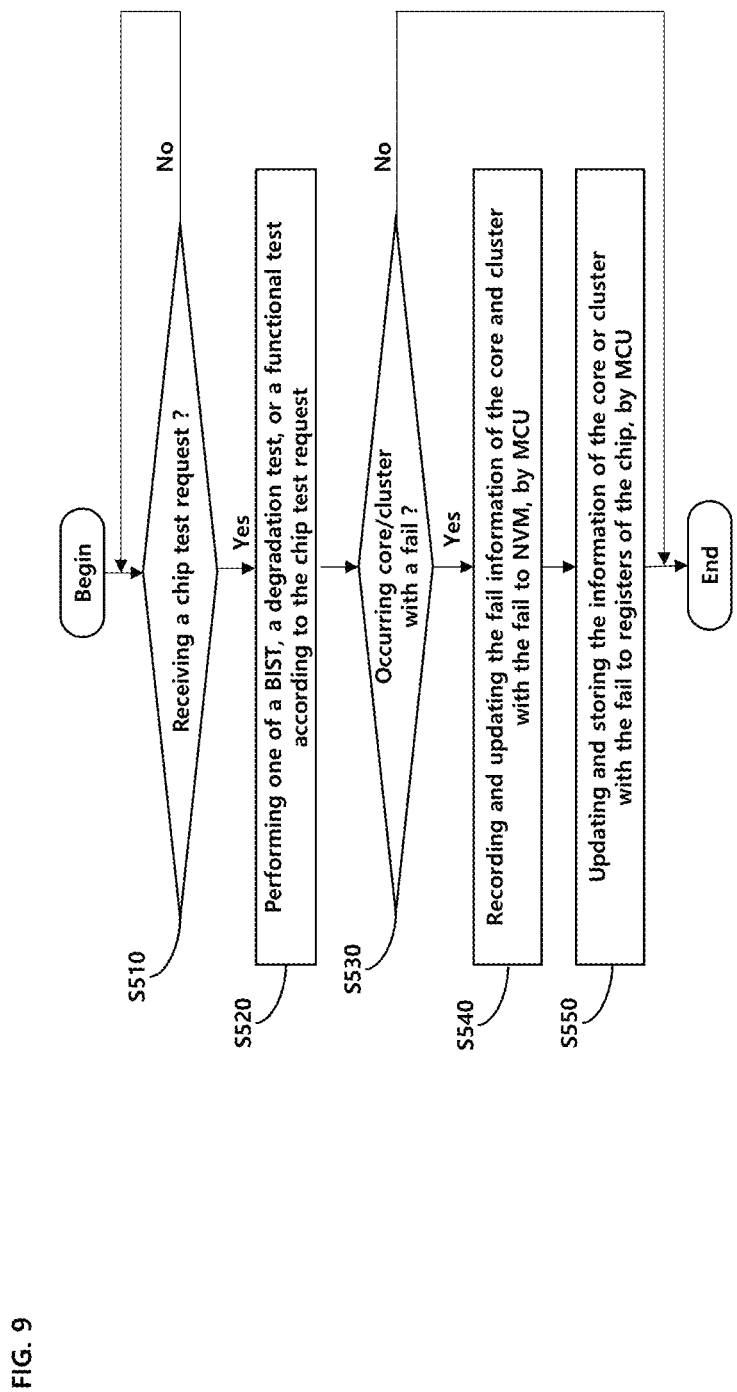
FIG. 9 is a flowchart depicting a process utilizing one of a Built-In Self-Test (BIST), a degradation test, or a functional test to performance harvesting while a device 100 performs performance harvesting according to an embodiment of the present invention.

FIG. 9 is a flowchart depicting a process utilizing one of a Built-In Self-Test (BIST), a degradation test, or a functional test to performance harvesting while a device 100 performs performance harvesting according to an embodiment of the present invention.

As shown in FIG. 9, when a chip test request is received from external sources, as shown in S510, the device performs at least one of a BIST, a degradation test, or a functional test according to the chip test request, as shown in S520.

If it is determined that faulty cores or clusters have occurred as results of the tests performed in S520 (S530), the MCU 200 updates and records the fault information of the faulty cores or clusters in the NVM 300.

Subsequently, the MCU 200 updates the fault information of the faulty cores or clusters by storing the fault information in the registers of the corresponding chip, as shown in S550.

The fault information recorded in the designated registers of each chip is read by the bad core manager 125 of each chip 100 and provided to the clock controller 123, where the clock controller 123 generates and supplies a modified clock to the core where the fault is defected, wherein the modified clock is generated by reset, masking, or gating the clock supplied to the corresponding core where the fault is detected. As a result, the core with the fault is blocked from operations.

Additionally, the MCU 200 compares the fault information stored in the NVM with the fault information read from the OTP memory in the bad core manager of each chip, then updates and stores new fault information in its own DRAM memory and the registers of each chip, and executes the task management through the task manager 122 of each chip based on the updated fault information.

The process of managing the fault information for each chip, as explained through FIG. 6 to FIG. 9, can be summarized as follows. Initially, the TEST manager 121 performs BIST and records the fault information for the cores where a fault is detected in OTP memory. Then the MCU 200 can detect additional fault information through the TEST manager 121 during the process of using the chip. Therefore, the MCU 200 reads the fault information recorded in OTP from each chip and compares the read fault information with the fault information stored in its own NVM memory. If new fault information is discovered, the new fault information is stored in its internal DRAM and utilized for computational tasks of an application domain, and the new fault information is stored in the registers of each chip and utilized for a task management through the task manager 122. Additionally, the clock controller 123 controls blocking the respective clock of the core with faults by resetting, masking, or gating the clock.

Figure 10:
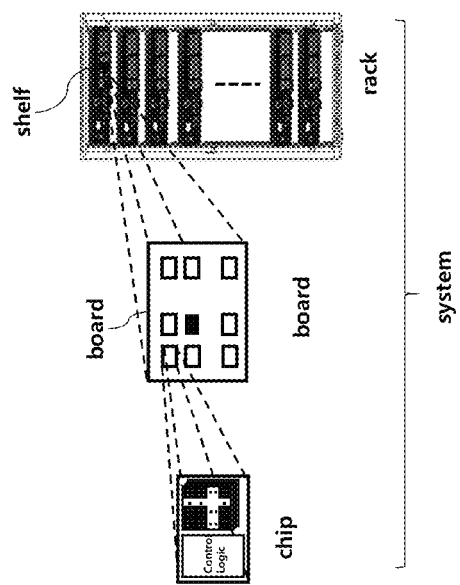
FIG. 10 is a drawing for depicting a concept of extending the performance harvesting method according to an embodiment of the present invention from a device 100 to a system configured with a board 400, a shelf 500, or a rack 600.

FIG. 10 is a drawing for depicting a concept of extending the performance harvesting method according to an embodiment of the present invention from a device 100 to a system configured with a board 400, a shelf 500, or a rack 600.

As shown in FIG. 10, the device 100 of performing performance harvesting according to the present invention is composed as a chip with a core matrix structure. It is also possible to perform performance harvesting by a cluster grouping a certain number of cores.

According to one embodiment of the present invention, multiple chips with a matrix structure can be used for a board, thereby constructing a larger-scale computational system. Furthermore, by utilizing multiple boards in a matrix structure, it is possible to construct a shelf, thereby constructing a larger scale computational system, moreover, using these multiple shelves configured in a matrix structure, it is possible to construct a rack, thereby expanding and composing an even larger-scale system.

That is, the control logic of the device 100 of performing performance harvesting according to the present invention can be extended and applied to systems composed of boards, shelves, and racks.

As described above, a device embedding multiple cores in a matrix form and enabling each of the multiple cores to be independently operated is effective for demonstrating predefined performance by harvesting the performance with operation of remaining cores, even if a specific core fails to operate due to a defect.

Furthermore, a chip in accordance with the present invention is configured to exclude defected cores from operation by bypassing the cores from the operation, in which the defects have been detected through monitoring the operational status of each of the multiple cores or through chip testing during the manufacturing process, and thereby the chip can produce desired computational result through performance exhibited by normally operated remaining core, even if some cores fail to operate, so that the chip is effective to extend its lifetime.

Furthermore, the method in accordance with the present invention enables the scope of performance harvesting to expand the system configured to comprise a board configured to independently perform a specified computation with each of multiple chips, a shelf or a rack configured to independently perform a specified computation with each of multiple boards.

Furthermore, a chip embedding with multiple cores in a matrix form according to the present invention is effective to enhance yields in the manufacturing process of the chip and extend lifetime of the chip in the process of usage.

Furthermore, according to the present invention, it is effective to extend lifetime for corresponding a board, a shelf, or a rack, for the system comprising the board composed of multiple chips in a matrix structure, or the shelf or rack composed of multiple boards.

Additionally, a method and a device performing the method in accordance with the present invention can be effectively utilized in hashing (including SHA-256, SHA-512, Proof-of-work, etc.) or cryptography algorithms used for internet banking, proof of work for cryptocurrencies (i.e., bitcoin), digital signatures, and so on, or in learning engines of artificial intelligence, where numerous cores independently operate the entire complex computations.

At least one of the components, elements, modules and units (collectively "components" in this paragraph) represented by a block or an equivalent indication in the drawings including FIGS. 1-4 described above may use a direct circuit structure, such as a memory, a processor, a logic circuit, a look-up table, etc. that may execute the respective functions through controls of one or more microprocessors or other control apparatuses. Alternatively or additionally, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as an application specific integrated circuits (ASIC), a central processing unit (CPU), graphic processing unit (GPU), another type of microprocessor, or the like that performs the respective functions. Two or more of these components may be combined into one single component which performs all operations or functions of the combined two or more components. Also, at least part of functions of at least one of these components may be performed by another of these components.

As described above, the present disclosure has been explained with reference to the embodiments illustrated in the figures, however, these are merely exemplary, and those having ordinary skill in the field to which the present invention belongs will understand that various modifications and equivalent other embodiments are possible from the embodiments. Therefore, the scope of technological protection of the present invention should be determined by the accompanied patent claims.

What is claimed is:

1. A method of performance harvesting in a device comprising multiple cores, the method comprising:
    detecting at least one bad core by detecting a fault in at least one of the multiple cores of the device comprising at least one core group in which the multiple cores are in a matrix structure; and
    performing a performance harvesting by bypassing operations of the at least one bad core among the multiple cores and by maintaining operations of normal cores without fault among the multiple cores,
    wherein the multiple cores are interconnected and configured to perform independent operations without being influenced by operations of adjacent cores,
    wherein each of the multiple cores comprises an essential core and a bypass circuit configured to control input and output data paths, and
    wherein the bypass circuit is configured to control the input and output data paths such that the at least one bad core is excluded from overall operations of the device without affecting the operations of the normal cores.

2. The method of claim 1, wherein the detecting of the at least one bad core comprises detecting a fault in each core by performing at least one of a built-in self-test (BIST), a degradation test, a functional test, and a combination thereof.

3. The method of claim 1, wherein the detecting of the at least one bad core further comprises:
performing a test scheduling by activating a test scheduler to execute a test;
generating test patterns according to the test scheduling; and
monitoring a response by inputting the generated test patterns into each of the multiple cores, and comparing a response of each of the multiple cores with an expected response.

4. The method of claim 3, wherein the monitoring of the response comprises:
determining that no fault is detected in a corresponding core, based on a detected fault rate for the corresponding core being below a certain fault rate; and
enabling certain tasks to be performed with the corresponding core in the performance harvesting based on a condition that a fault is detected in the corresponding core and it is possible for the corresponding core to correctly execute the certain tasks functionally.

5. The method of claim 1, wherein the performing of the performance harvesting comprises:
ignoring results of tasks assigned to the at least one bad core in which the fault is detected, and
independently performing the assigned tasks with the normal cores.

6. The method of claim 1, wherein the performing of the performance harvesting comprises:
providing a modified clock to the at least one bad core in which a fault is detected, and
bypassing input data of the at least one bad core to output data,
wherein the modified clock is a clock generated by masking, resetting, gating, or a combination thereof, of a normal clock provided to the at least one bad core.

7. A device of performing a performance harvesting in a core matrix structure, the device comprising:
at least one core group comprising multiple cores in a matrix structure; and
a control logic circuit part configured to bypass operations of at least one fault detected core among the multiple cores and to enable the performance harvesting with normal cores without fault among the multiple cores,
wherein the multiple cores are interconnected and configured to perform independent operations without being influenced by operations of adjacent cores,
wherein each of the multiple cores comprises an essential core and a bypass circuit configured to control input and output data paths, and
wherein the bypass circuit is configured to control the input and output data paths such that the at least one fault detected core is excluded from overall operations of the device without affecting operations of the normal cores.

8. The device of claim 7, wherein the control logic circuit further comprises:
a test manager configured to detect fault in at least one core among the multiple cores;
a task manager configured to manage allocation of tasks to the multiple cores according to the detected fault; and
a bad core manager configured to record and manage the detected fault.

9. The device of claim 8, wherein the test manager is configured to detect fault in each core by performing at least one of a built-in self-test (BIST), a degradation test, a functional test, and a combination thereof.

10. The device of claim 8, wherein the test manager further comprises:
a test scheduler configured to perform a test scheduling for executing a test,
a test pattern generator configured to generate test patterns according to the test scheduling; and
a response monitor configured to input the generated test patterns into each of the multiple cores and to compare a response from each of the multiple cores with an expected response.

11. The device of claim 10, wherein the response monitor is configured to determine that no fault is detected in a corresponding core, based on a detected fault rate for the corresponding core being below a certain fault rate, and configure to enable certain tasks with the corresponding core in the performance harvesting based on a condition that a fault is detected in the corresponding core and it is possible for the corresponding core to correctly execute the certain tasks functionally.

12. The device of claim 8, wherein the task manager is configured to ignore results of tasks assigned to the at least one fault detected core in which a fault is detected, and to independently perform the assigned tasks with the normal cores.

13. The device of claim 7, wherein the control logic circuit further comprises:
a clock controller configured to provide a modified clock to the at least one fault detected core in which the fault is detected,
wherein the clock controller is further configured to bypass input data of the at least one fault detected core to output data by providing the modified clock to the at least one fault detected core in which the fault is detected, and
wherein the modified clock is a clock generated by masking, resetting, gating, or a combination thereof, of a normal clock provided to the at least one fault detected core.

* * * * *